(12) United States Patent
Mueller-Brincken et al.

(10) Patent No.: US 12,065,196 B2
(45) Date of Patent: Aug. 20, 2024

(54) BATTERY STORAGE ARRANGEMENT, USE OF A CARRIER, METHOD FOR ASSEMBLING A BATTERY STORAGE ARRANGEMENT, AND WORKING DEVICE

(71) Applicant: Bayerische Motoren Werke Aktiengesellschaft, Munich (DE)

(72) Inventors: Jan Mueller-Brincken, Munich (DE); Martin Schuster, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 619 days.

(21) Appl. No.: 17/267,232

(22) PCT Filed: Jul. 18, 2019

(86) PCT No.: PCT/EP2019/069407
§ 371 (c)(1),
(2) Date: Feb. 9, 2021

(87) PCT Pub. No.: WO2020/030401
PCT Pub. Date: Feb. 13, 2020

(65) Prior Publication Data
US 2021/0214020 A1 Jul. 15, 2021

(30) Foreign Application Priority Data
Aug. 10, 2018 (DE) ...................... 10 2018 213 517.7

(51) Int. Cl.
*B62D 27/06* (2006.01)
*B60K 1/04* (2019.01)
*H01M 50/262* (2021.01)

(52) U.S. Cl.
CPC .............. *B62D 27/065* (2013.01); *B60K 1/04* (2013.01); *B60K 2001/0438* (2013.01);
(Continued)

(58) Field of Classification Search
CPC .............. B62D 27/065; B62D 25/2036; B62D 25/025; B60K 2001/0438; B60K 2001/0472
See application file for complete search history.

(56) References Cited

U.S. PATENT DOCUMENTS 8,939,246 B2 * 1/2015 Yamaguchi ............. B60L 50/66
180/311
10,112,470 B2 * 10/2018 Hamilton ............... B62D 25/20
(Continued)

FOREIGN PATENT DOCUMENTS

CN   106410077 A   2/2017
CN   108081939 A   5/2018
(Continued)

OTHER PUBLICATIONS

International Search Report (PCT/ISA/210) issued in PCT Application No. PCT/EP2019/069407 dated Sep. 2, 2019 with English translation (seven (7) pages).
(Continued)

*Primary Examiner* — Jason S Morrow
(74) *Attorney, Agent, or Firm* — Crowell & Moring LLP

(57) ABSTRACT

A battery storage arrangement for a working device, in particular for a vehicle, includes a battery storage and a carrier. The carrier has a monolithic screwing area having a thread. The battery storage is fastened to the carrier by way of a threaded fastener via the screwing area.

16 Claims, 3 Drawing Sheets

(52) U.S. Cl.
CPC ... *B60K 2001/0472* (2013.01); *H01M 50/262* (2021.01); *H01M 2220/20* (2013.01)

(56) References Cited

U.S. PATENT DOCUMENTS

| | | | | |
|---|---|---|---|---|
| 10,266,045 | B2* | 4/2019 | Goettfried | B62D 21/157 |
| 10,272,759 | B2* | 4/2019 | Sudhindra | B60L 50/64 |
| 10,780,926 | B2* | 9/2020 | Lee | B62D 25/2036 |
| 10,913,340 | B2* | 2/2021 | Tsuyuzaki | B60K 1/04 |
| 11,148,723 | B2* | 10/2021 | Chung | B62D 25/2036 |
| 11,420,681 | B2* | 8/2022 | Kim | B62D 27/02 |
| 11,548,364 | B2* | 1/2023 | Lee | B62D 24/00 |
| 11,713,079 | B2* | 8/2023 | Woo | B62D 25/2018 |
| | | | | 280/781 |
| 2018/0141424 | A1 | 5/2018 | Goettfried et al. | |
| 2018/0194212 | A1 | 7/2018 | Hamilton et al. | |
| 2022/0073143 | A1* | 3/2022 | Woo | B62D 25/025 |
| 2023/0174164 | A1* | 6/2023 | Doll | B62D 25/20 |
| | | | | 296/193.07 |
| 2023/0238638 | A1* | 7/2023 | Lee | H01M 50/249 |
| | | | | 429/100 |
| 2023/0249535 | A1* | 8/2023 | Jin | B60L 50/64 |
| | | | | 180/68.5 |

FOREIGN PATENT DOCUMENTS

| | | |
|---|---|---|
| DE | 10 2011 113 112 A1 | 3/2013 |
| DE | 10 2012 202 164 A1 | 8/2013 |
| DE | 10 2018 100 152 A1 | 7/2018 |
| EP | 2 070 754 A1 | 6/2009 |
| EP | 3 326 853 A1 | 5/2018 |
| JP | 2000-85375 A | 3/2000 |

OTHER PUBLICATIONS

German-language Written Opinion (PCT/ISA/237) issued in PCT Application No. PCT/EP2019/069407 dated Sep. 2, 2019 (six (6) pages).

German-language Search Report issued in German Application No. 10 2018 213 517.7 dated Mar. 26, 2019 with partial English translation (12 pages).

English translation of Chinese-language Office Action issued in Chinese Application No. 201980037105.5 dated Dec. 13, 2023 (6 pages).

* cited by examiner

BATTERY STORAGE ARRANGEMENT, USE OF A CARRIER, METHOD FOR ASSEMBLING A BATTERY STORAGE ARRANGEMENT, AND WORKING DEVICE

BACKGROUND AND SUMMARY OF THE INVENTION

The present invention relates to a battery storage arrangement for a working device and in particular for a vehicle, use of a carrier for assembling a battery storage, a method for assembling a battery storage arrangement and a working device and in particular a vehicle.

In the case of working devices and in particular in the automotive sector, drives and other power units are ever more frequently electrically driven. Hitherto the storage batteries required for this purpose so as to provide the necessary electrical energy have been assembled on the carrier by way of additional assembly means, for example by way of press-in nuts that are to be attached to the carrier, weld nuts or the like, which act as connecting elements and render it possible to create a screw connection.

In this case, it is disadvantageous that an additional assembly process is necessary in order to attach the connection means to the carrier.

The object of the invention is to provide a battery storage arrangement, use of a carrier, a method for assembling a battery storage arrangement and a working device, wherein it is possible using particularly simple means to attach a battery storage to a carrier in a reliable manner.

The object forming the basis of the invention is achieved in the case of a battery storage arrangement, use of a carrier, a method for assembling a battery storage arrangement and a working device and in particular a vehicle, in accordance with the claimed invention.

In accordance with a first aspect of the present invention, a battery storage arrangement is created for a working device and in particular for a vehicle, the battery storage arrangement having a battery storage and a carrier, wherein the carrier comprises a screw-on region that is embodied as one piece of material and is integral with the carrier and has a thread and wherein the battery storage having a threaded fastener is attached to the carrier by way of the screw-on region. By virtue of the measures provided in accordance with the invention, the conventional step that is to be performed for assembling an attachment having a counter thread for the threaded fastener on the carrier is omitted. As a consequence, the assembly procedure in the case of attaching the battery storage is simplified.

With respect to the stability of the battery storage arrangement, a particularly high degree of reliability is realized if in accordance with a preferred embodiment of the battery storage arrangement in accordance with the invention the screw-on region is embodied or will be embodied as a solid material and/or as a solid material region.

On the other hand, it is possible to considerably reduce the amount of material required and consequently greatly reduce the weight, if in accordance with another exemplary embodiment of the battery storage arrangement in accordance with the invention, the screw-on region is embodied or will be embodied in the material region that is reshaped in the interior of the carrier, for example as a drawn structure and/or as a collar or the like.

Moreover, in order to stabilize the screw connection, it is of advantage if in addition or alternatively the screw-on region:

(i) in a screw-in direction has a depth of a value which (a) lies in a range of approximately half to approximately double the diameter of the threaded fastener, in particular of a shaft of the threaded fastener, (b) lies in a range of approximately half to approximately double the diameter of a screw hole of the screw-on region and/or (c) lies in a range of approximately 3 times to approximately 5 times the wall thickness of a wall of the carrier, and/or (ii) has a width and/or a diameter of a value which (i) corresponds to the diameter of the threaded fastener and/or a diameter of a screw hole of the screw-on region with respect to double a wall thickness of the screw-on region, (ii) lies in a range of maximal double the diameter of the threaded fastener and/or (iii) lies in a range of approximately 4 times to approximately 10 times the wall thickness of a wall of the carrier and/or of approximately 1 times to approximately double the screw length.

Furthermore, the present invention also relates to use of a carrier having a screw-on region that is embodied as one piece of material and is integral with the carrier and has a thread for assembling and/or receiving a battery storage for a working device and in particular for a vehicle by way of a threaded fastener that is to be inserted into the screw-on region.

In this case, it is particularly advantageous with respect to aspects of stability if the screw-on region of the carrier is embodied or will be embodied as a solid material and/or as a solid material region.

Alternatively or in addition, it is possible to provide that the screw-on region of the carrier is embodied or will be embodied as a material region that is reshaped in the interior of the carrier.

Moreover, it is conceivable in the case of use in accordance with the invention of a carrier, that in addition or alternatively, the screw-on region of the carrier:

(i) has in a screw-in direction a depth of a value which (a) lies in a range of approximately half to approximately double the diameter of the threaded fastener, in particular of a shaft of the threaded fastener, (b) lies in a range of approximately half to approximately double the diameter of a screw hole of the screw-on region and/or (c) lies in a range of approximately 3 times to approximately 5 times the wall thickness of a wall of the carrier, and/or (ii) has a width or a diameter of a value which (i) corresponds to the diameter of the threaded fastener and/or a diameter of a screw hole of the screw-on region with respect to double a wall thickness of the screw-on region, (ii) lies in a range of maximal double the diameter of the threaded fastener and/or (iii) lies in a range of approximately 4 times to approximately 10 times the wall thickness of a wall of the carrier and/or of approximately 1 times to approximately double the screw length.

Furthermore, the subject matter of the present invention also discloses a method for assembling a battery storage arrangement for a working device and in particular for a vehicle.

The method in accordance with the invention has the steps:
provide a battery storage,
provide a carrier, wherein the carrier comprises a screw-on region that is embodied as one piece of material and has a thread,
provide a threaded fastener, and assemble the battery storage by means of screwing it using the threaded fastener to the screw-on region and as consequence attach the battery storage to the carrier.

Finally, the present invention also provides a working device having an electrically drivable power unit and a battery storage arrangement.

In this case, the battery storage arrangement is configured in accordance with the invention and comprises a battery storage which is embodied so as to supply the power unit with the electrical energy that it requires for its operation.

Moreover, a carrier is embodied which comprises a screw-on region that is embodied as one piece of material and is integral with the carrier and the carrier is in particular a component of the working device.

The working device can be embodied in particular as a vehicle, as a passenger car, as a truck or the like. However, it can also be a working robot or the like.

In the context of motor vehicles as working devices, it is possible for a respective carrier to be a vehicle longitudinal member, a sill or the like.

Further details, features and advantages of the invention are disclosed in the description below and the figures.

DETAILED DESCRIPTION OF THE DRAWINGS

Figure 1:
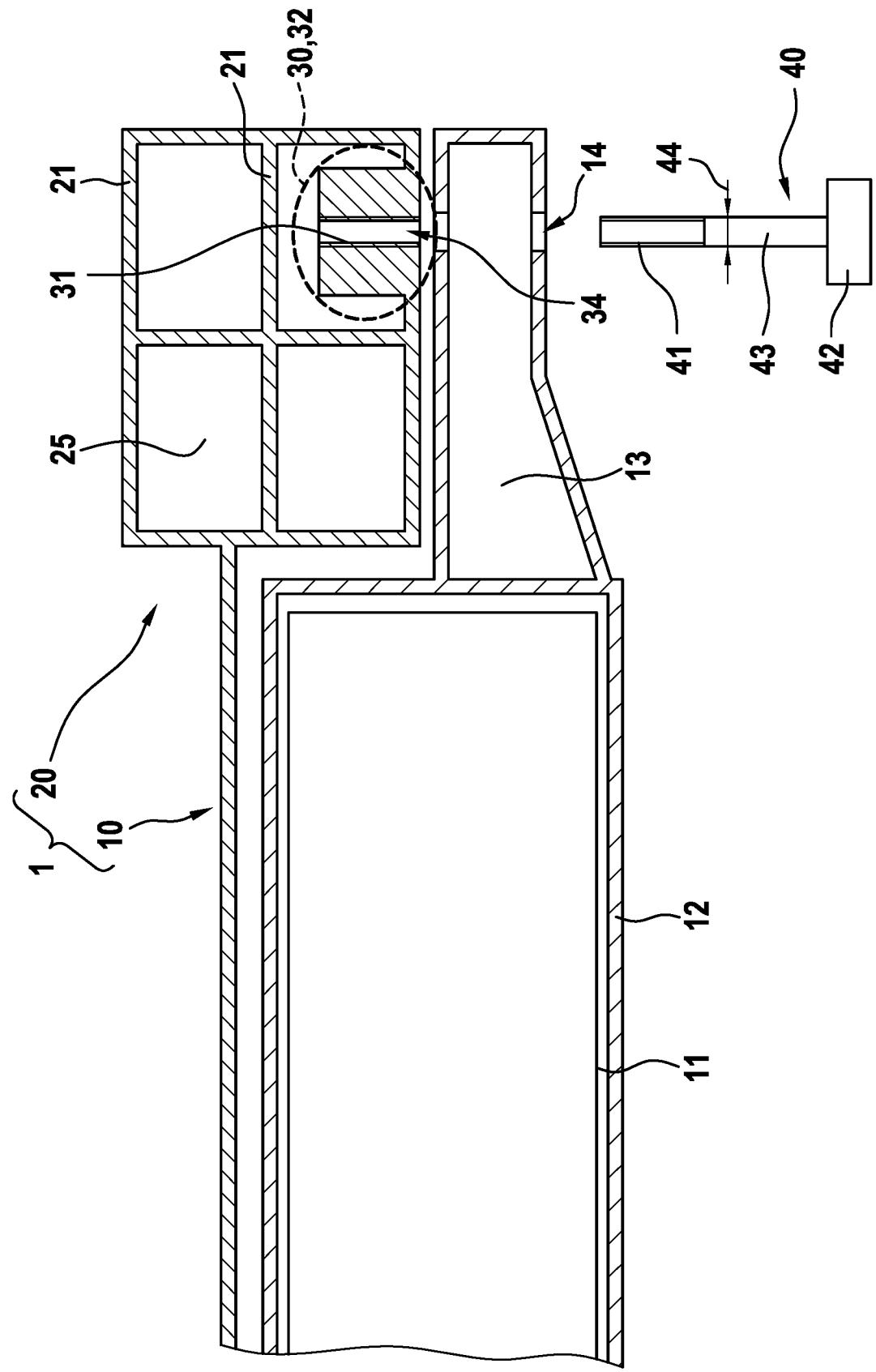
FIG. 1 illustrates a schematic and in part sectional front view of one embodiment of a battery storage arrangement in accordance with the invention in a state in which a battery storage is not yet attached to a carrier by a threaded fastener.

Exemplary embodiments and the technical background of the invention are described in detail below with reference to FIGS. 1 to 3. Like and equivalent, and also like or equivalent, functioning elements and components are described by the same reference numerals. The detailed description of the described elements and components is not repeated in each case that they occur.

The illustrated features and further characteristics can be isolated from one another in any form and can be combined with one another as desired without abandoning the essence of the invention.

FIG. 1 illustrates a schematic and in part sectional front view of one embodiment of a battery storage arrangement 1 in accordance with the invention in a state in which a battery storage 10 is not yet attached to a carrier 20 by a threaded fastener 40.

According to the essence of the invention, the battery storage arrangement 1 therefore comprises a dedicated battery storage 10 which has a cell module 11 in a housing 12 and a holding frame 13, wherein, by using a threaded fastener 40, for example a screw having a head 42 and shaft 43 having a thread 41 that cooperates with the thread 31, the holding frame 13 can be assembled on and attached to the carrier 20 by way of an assembly hole 14 that is aligned with an assembly hole 34, which comprises a thread 31 as a threaded hole on the screw-on region 30 of the carrier 20.

Figure 2:
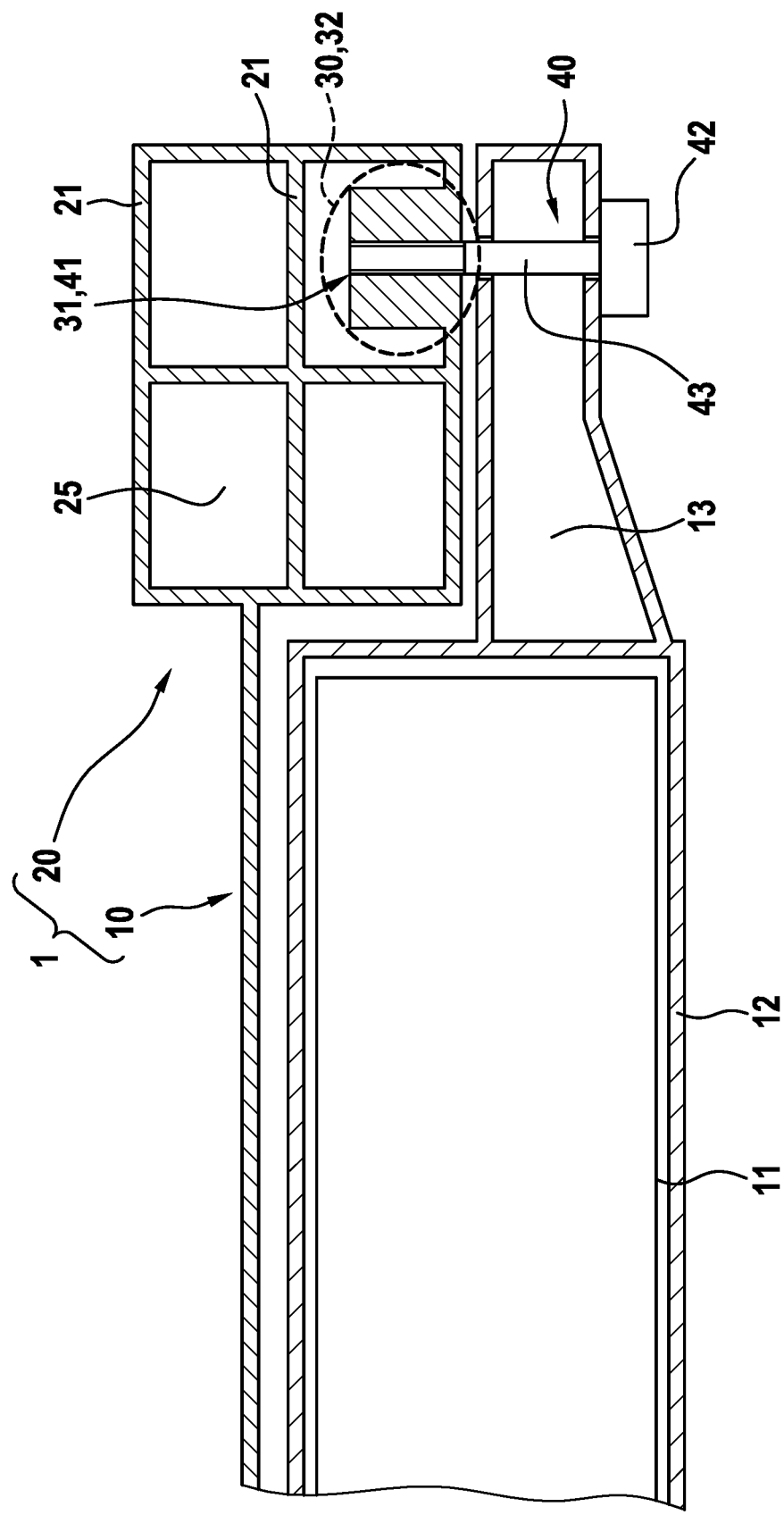
FIG. 2 illustrates a schematic and in part sectional front view of the embodiment of the battery storage arrangement in accordance with the invention in a state in which the battery storage is attached to the carrier by means of a threaded fastener.

FIG. 2 illustrates a schematic and in part sectional front view of the embodiments of the battery storage arrangement 1 in accordance with the invention from FIG. 1 in a state in which the battery storage 10 is attached to the carrier 20 by means of the threaded fastener 40.

Figure 3:
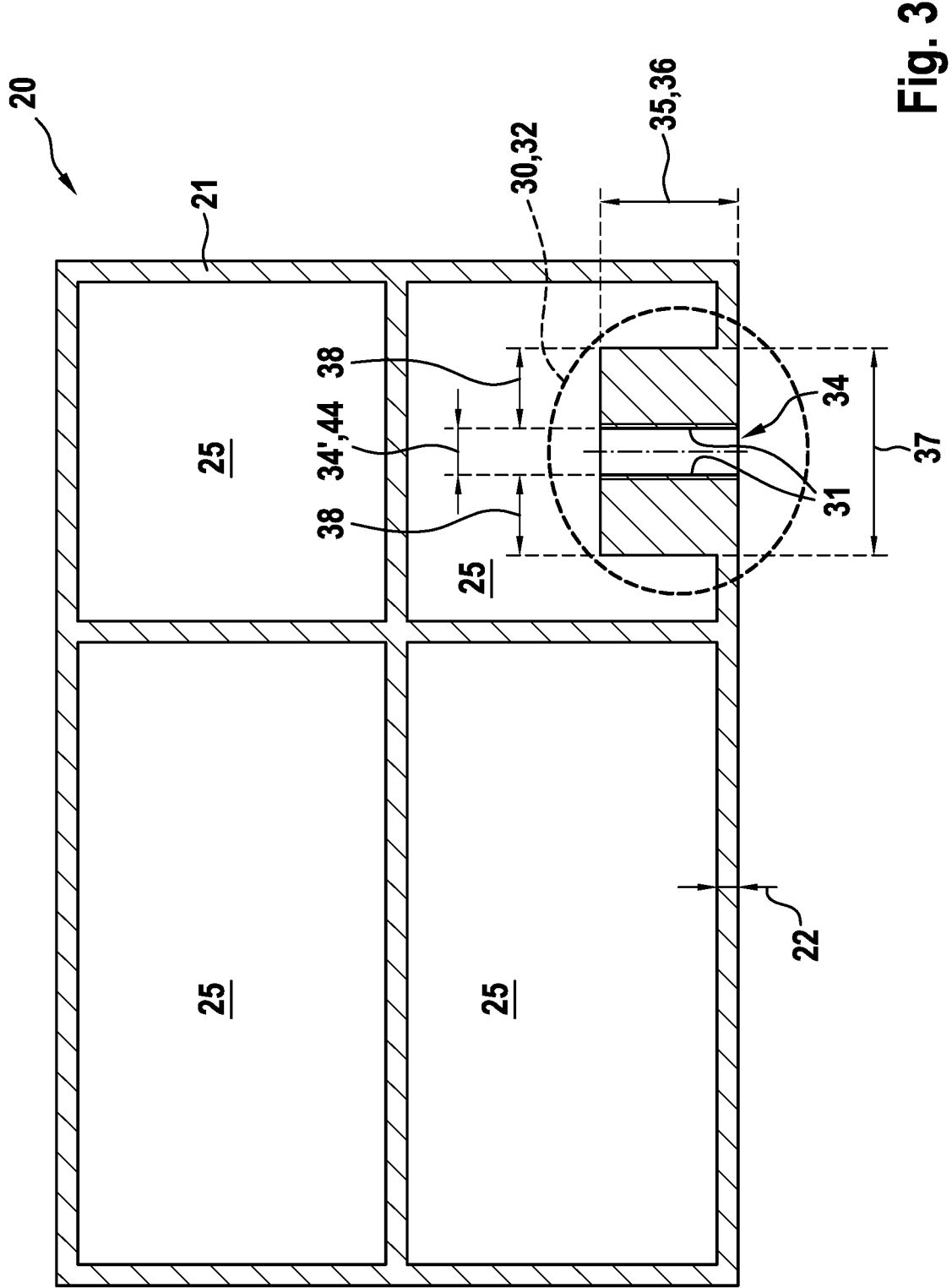
FIG. 3 illustrates a schematic and in part sectional front view of details of a carrier that can be used in accordance with the invention.

FIG. 3 illustrates a schematic and in part sectional front view of details of a carrier 20 that can be used in accordance with the invention.

FIGS. 1 and 2 illustrate the configuration of the carrier 20 as a longitudinal member having a plurality of walls 21 that form and encompass the interior 25 of the carrier 20 namely according to a type of multiple chambers that are delimited by the walls 21 and can be in particular open at their ends.

One of the chambers of the interior 25 of the carrier 20 is embodied as one piece of material with a corresponding screw-on region 30. This means that the carrier 20 itself, in other words therefore also with the screw-on region 30, forms a unit that is embodied as one piece of material. As a consequence, in accordance with the invention, it is not necessary to assemble a corresponding mating piece, for example in the form of a nut or the like, for the threaded fastener 40. On the contrary, it is possible in accordance with the invention to screw the threaded fastener 40 directly into the carrier, namely into the thread 31 of the screw-on region 30.

In FIG. 3, the dimensioning of the screw-on regions 30 as solid material regions 32 is also indicated schematically, and in fact with the depth 35, namely protruding into the interior 25 of the carrier 20. The depth corresponds to the screw length 36 and has a width or the diameter 37 of the screw-on regions 30. In this case, reference can be made respectively to the screw length 36 or to the wall thickness 22 of the walls 21.

These and further features and characteristics of the present invention are further explained with the aid of the following illustrations.

Conventionally, a battery storage is connected to structures—for example to a carrier of a vehicle body—by way of screwing to connecting elements in the structure, for example by way of screw nuts or press-in nuts.

The connecting elements that are conventionally used must be inserted into the bodywork structure parts, such as for example metal sheets or profiles, in a joining operation. Moreover, these elements are embodied from steel, which in combination with aluminium components, can lead to problems with respect to corrosion.

Also, the connecting elements do not guarantee an optimal rigid connection or the connecting elements must be anchored rigidly in the structure by means of additional joining operations and with the aid of additional components.

In the case of the embodiment in accordance with the invention as longitudinal members on the side, for example as sills and/or in the form of an extruded section, the region of the screw connection, which is also described as the screw-on regions 30 of the carrier 20, can be embodied as one piece of material and integral with the rest of the carrier 20 and in particular as a solid material. The result is that the screw-on region can be screwed with sufficient screw-connecting length or screw length 36 directly into the profile of the carrier 20.

Such a use or application for connecting a battery storage 10 to a working device 1, namely by way of a correspondingly designed carrier 20, is novel and advantageous because in particular the advantages listed below are achieved.

The construction in accordance with the invention has comparatively the same weight as conventional solutions having steel connecting elements.

In addition, a comparatively high degree of rigidity in the connection is realized in accordance with the invention.

Moreover, it is not necessary to perform any additional joining operations on the carrier 20, for example on a longitudinal member on the side.

Finally, it is possible to more easily avoid corrosion problems within the bodywork structure because it is possible using simple means to coordinate the material of the individual components with one another.

LIST OF REFERENCE NUMERALS

1 Battery storage arrangement
10 Battery storage
11 Cell module, cell arrangement
12 Housing
13 Frame
14 Assembly hole
20 Carrier
21 Wall
22 Wall thickness
25 Interior
30 Screw-on region
31 Thread
32 Sold material region
34 Assembly hole, threaded hole
34' Diameter of the assembly hole 34
35 Depth of the screw-on region 30 transversally
36 Screw length
37 Width, diameter of the screw-on region 30 laterally
38 Wall thickness of the screw-on region 30
40 Threaded fastener, screw
41 Thread
42 head of the screw/of the threaded fastener 40
43 Shaft of the screw/of the threaded fastener 40
44 Diameter of the threaded fastener/of the shaft 43 of the threaded fastener 40
100 Working device

What is claimed is:

1. A battery storage arrangement for a working device, comprising:
    a battery storage, and
    a carrier,
    wherein the carrier comprises a screw-on region that is embodied as one piece of material and is integral with, and protrudes into an interior of, the carrier and has a thread,
    wherein the battery storage having a threaded fastener is attached to the carrier by way of the screw-on region,
    wherein a wall thickness, in the interior of the carrier, of the screw-on region is greater than a diameter of the threaded fastener.

2. The battery storage arrangement according to claim 1, wherein
    the screw-on region is embodied as a solid material and/or as a solid material region.

3. The battery storage arrangement according to claim 1, wherein
    the screw-on region is a reshaped material region in the interior of the carrier.

4. The battery storage arrangement according to claim 1, wherein the screw-on region:
    in a screw-in direction has a depth of a value which lies in a range of approximately half to approximately double a diameter of the threaded fastener and/or lies in a range of approximately 3 times to approximately 5 times a wall thickness of a wall of the carrier.

5. The battery storage arrangement according to claim 4, wherein the screw-on region:
    has a width and/or a diameter of a value which corresponds to the diameter of the threaded fastener with respect to double a wall thickness of the screw-on region, lies in a range of maximal double the diameter of the threaded fastener and/or lies in a range of approximately 4 times to approximately 10 times the wall thickness of a wall of the carrier and/or of approximately 1 times to approximately double a screw length.

6. The battery storage arrangement according to claim 1, wherein the screw-on region:
    has a width and/or a diameter of a value which corresponds to the diameter of the threaded fastener with respect to double a wall thickness of the screw-on region, lies in a range of maximal double the diameter of the threaded fastener and/or lies in a range of approximately 4 times to approximately 10 times the wall thickness of a wall of the carrier and/or of approximately 1 times to approximately double a screw length.

7. The battery storage arrangement according to claim 1, wherein
    the battery storage arrangement is configured for a vehicle.

8. Use of a carrier comprising a screw-on region that is embodied as one piece of material and is integral with, and protrudes into an interior of, the carrier and has a thread for assembling and/or receiving a battery storage for a vehicle by way of a threaded fastener that is to be inserted into the screw-on region, wherein a wall thickness, in the interior of the carrier, of the screw-on region is greater than a diameter of the threaded fastener.

9. The use according to claim 8, wherein
    the screw-on region of the carrier is embodied as a solid material and/or as a solid material region.

10. The use according to claim 8, wherein
    the screw-on region of the carrier is a reshaped material region in an interior of the carrier.

11. The use according to claim 8, wherein the screw-on region of the carrier:
    in a screw-in direction has a depth of a value which lies in a range of approximately half to approximately double a diameter of the threaded fastener and/or lies in a range of approximately 3 times to approximately 5 times a wall thickness of a wall of the carrier.

12. The use according to claim 11, wherein the screw-on region of the carrier:
    has a width or a diameter of a value which corresponds to the diameter of the threaded fastener with respect to double a wall thickness of the screw-on region, lies in a range of maximal double the diameter of the threaded fastener and/or lies in a range of approximately 4 times to approximately 10 times the wall thickness of a wall of the carrier and/or of approximately 1 times to approximately double the screw length.

13. The use according to claim 8, wherein the screw-on region of the carrier:
    has a width or a diameter of a value which corresponds to the diameter of the threaded fastener with respect to double a wall thickness of the screw-on region, lies in a range of maximal double the diameter of the threaded fastener and/or lies in a range of approximately 4 times to approximately 10 times the wall thickness of a wall of the carrier and/or of approximately 1 times to approximately double the screw length.

14. A method for assembling a battery storage arrangement for a working device, comprising:
providing a battery storage;
providing a carrier, wherein the carrier comprises a screw-on region that is embodied as one piece of material and is integral with, and protrudes into an interior of, the carrier and has a thread;
providing a threaded fastener; and
assembling the battery storage by screwing the battery storage using the threaded fastener to the screw-on region of the carrier, wherein a wall thickness, in the interior of the carrier, of the screw-on region is greater than a diameter of the threaded fastener, whereby the battery storage is attached to the carrier.

15. The method according to claim 14, wherein the carrier is a longitudinal carrier of a vehicle.

16. A vehicle, comprising:
an electrically drivable power unit;
a battery storage arrangement according to claim 1,
wherein the battery storage arrangement is configured to supply the electrically drivable power unit with electrical energy required for operation, and
the battery storage arrangement comprises a battery storage and a carrier which is a component of the vehicle.

* * * * *